United States Patent
Porat et al.

(10) Patent No.: US 10,244,414 B2
(45) Date of Patent: Mar. 26, 2019

(54) SIGNAL FIELD (SIG) DESIGN WITHIN OFDM/OFDMA WIRELESS COMMUNICATIONS

(71) Applicant: BROADCOM CORPORATION, Irvine, CA (US)

(72) Inventors: Ron Porat, San Diego, CA (US); Matthew James Fischer, Mountain View, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 207 days.

(21) Appl. No.: 15/185,911

(22) Filed: Jun. 17, 2016

(65) Prior Publication Data

US 2016/0301491 A1 Oct. 13, 2016

Related U.S. Application Data

(63) Continuation-in-part of application No. 14/192,228, filed on Feb. 27, 2014, now Pat. No. 9,379,837.

(Continued)

(51) Int. Cl.
*H04J 11/00* (2006.01)
*H04L 27/26* (2006.01)
(Continued)

(52) U.S. Cl.
CPC .......... *H04W 24/08* (2013.01); *H04B 17/345* (2015.01); *H04J 11/0026* (2013.01);
(Continued)

(58) Field of Classification Search
None
See application file for complete search history.

(56) References Cited

U.S. PATENT DOCUMENTS

| 8,023,955 B2 * | 9/2011 | Anderson | H04W 52/34 370/310.2 |
| 2007/0140168 A1 * | 6/2007 | Laroia | H04W 24/08 370/330 |

(Continued)

*Primary Examiner* — Chirag G Shah
*Assistant Examiner* — Srinivasa R Reddivalam
(74) *Attorney, Agent, or Firm* — Garlick & Markison; Randy W. Lacasse

(57) ABSTRACT

A wireless communication device (alternatively, device, WDEV, etc.) includes a processing circuitry configured to support communications with other WDEV(s) and to generate and process signals for such communications. In some examples, the device includes a communication interface and a processing circuitry, among other possible circuitries, components, elements, etc. to support communications with other WDEV(s) and to generate and process signals for such communications. A WDEV generates and transmits a first signal that includes a field that specifies an acceptable interference level (AIL) for concurrent communication for use by a first other WDEV to determine whether a transmission from the first other WDEV to a second other WDEV acceptably or unacceptably interferes with another transmission from the WDEV. Concurrent communication (e.g., from the WDEV to a third other WDEV, and from the first other WDEV to the second other WDEV) may be made when the AIL compares favorably with the AIL.

20 Claims, 10 Drawing Sheets

Related U.S. Application Data

(60) Provisional application No. 61/804,718, filed on Mar. 24, 2013, provisional application No. 61/888,873, filed on Oct. 9, 2013, provisional application No. 61/936,158, filed on Feb. 5, 2014, provisional application No. 62/187,789, filed on Jul. 1, 2015, provisional application No. 62/342,552, filed on May 27, 2016.

(51) Int. Cl.
*H04W 16/14* (2009.01)
*H04W 24/08* (2009.01)
*H04W 52/16* (2009.01)
*H04B 17/345* (2015.01)

(52) U.S. Cl.
CPC ......... *H04L 27/2602* (2013.01); *H04W 52/16* (2013.01); *H04W 16/14* (2013.01)

(56) References Cited

U.S. PATENT DOCUMENTS

| | | | |
|---|---|---|---|
| 2009/0017850 A1* | 1/2009 | Jovicic | H04W 52/34 455/501 |
| 2010/0189048 A1* | 7/2010 | Baker | H04L 5/0037 370/329 |
| 2011/0069630 A1* | 3/2011 | Doppler | H04W 16/14 370/252 |
| 2013/0003583 A1* | 1/2013 | Landstrom | H04B 7/0452 370/252 |

\* cited by examiner

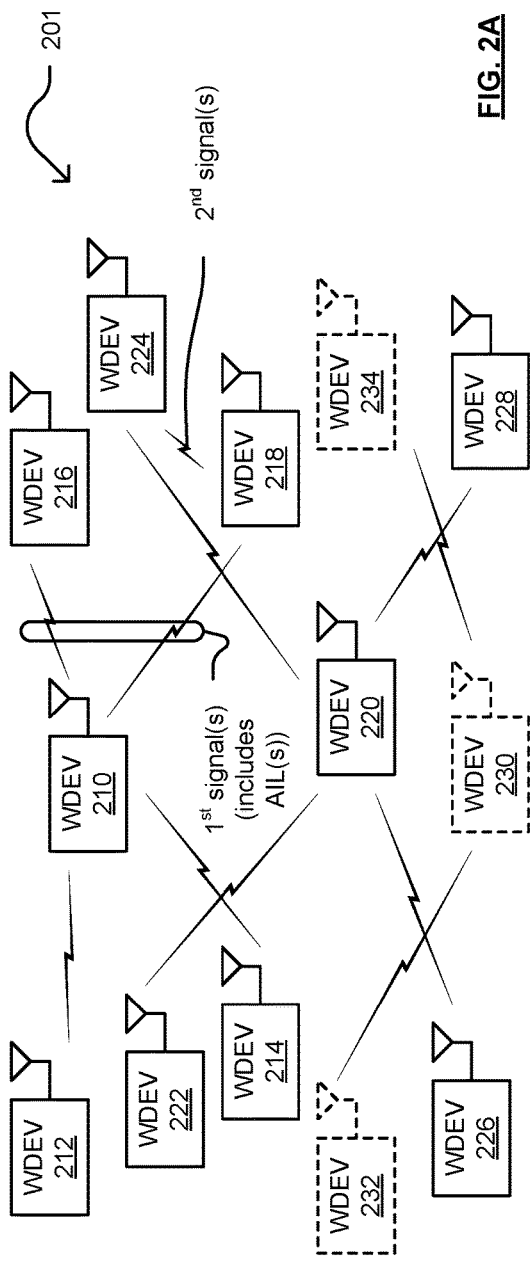
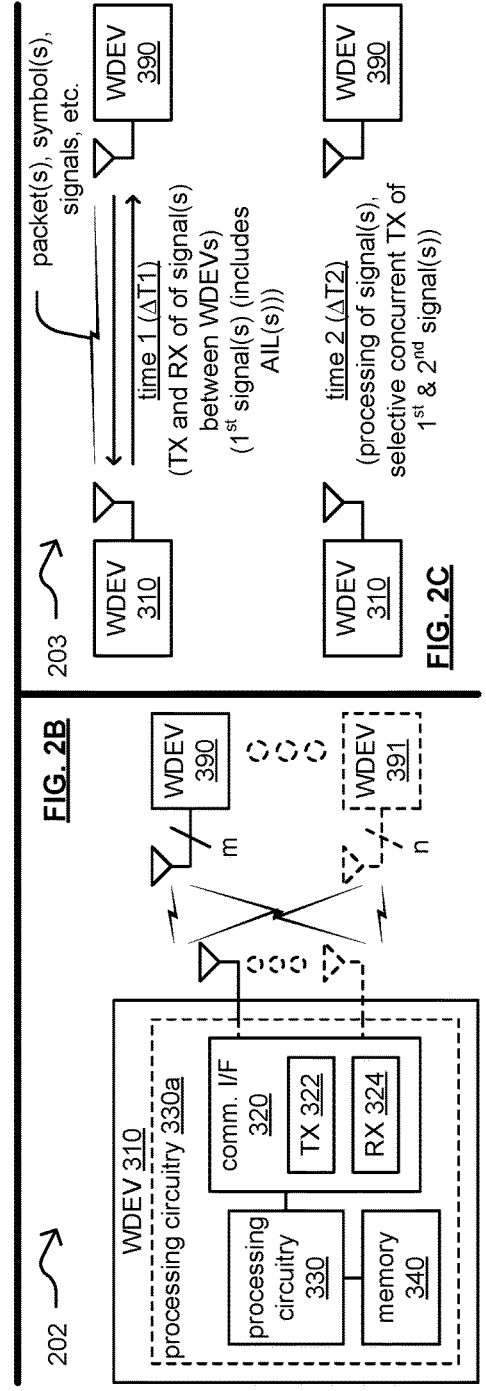

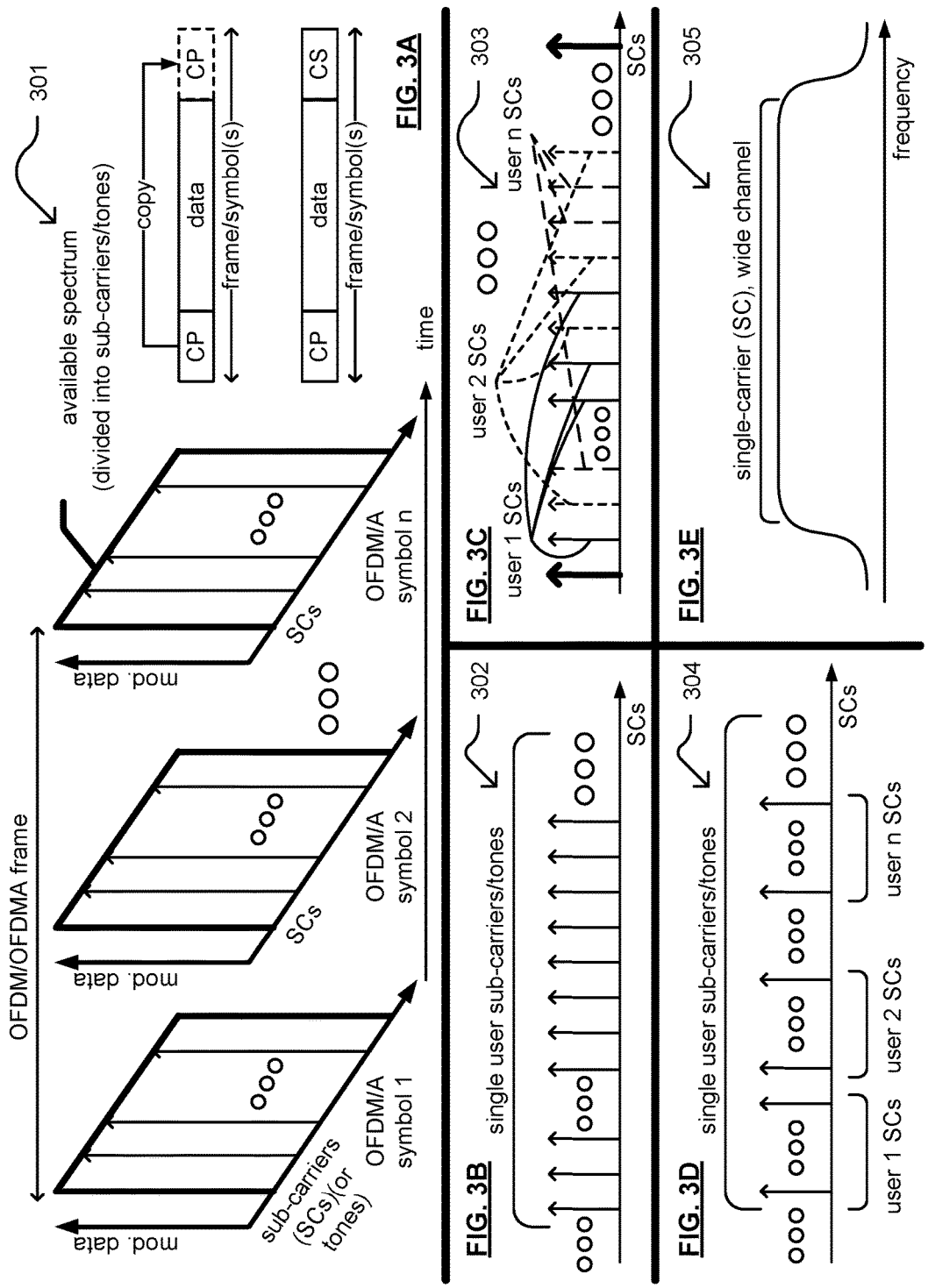

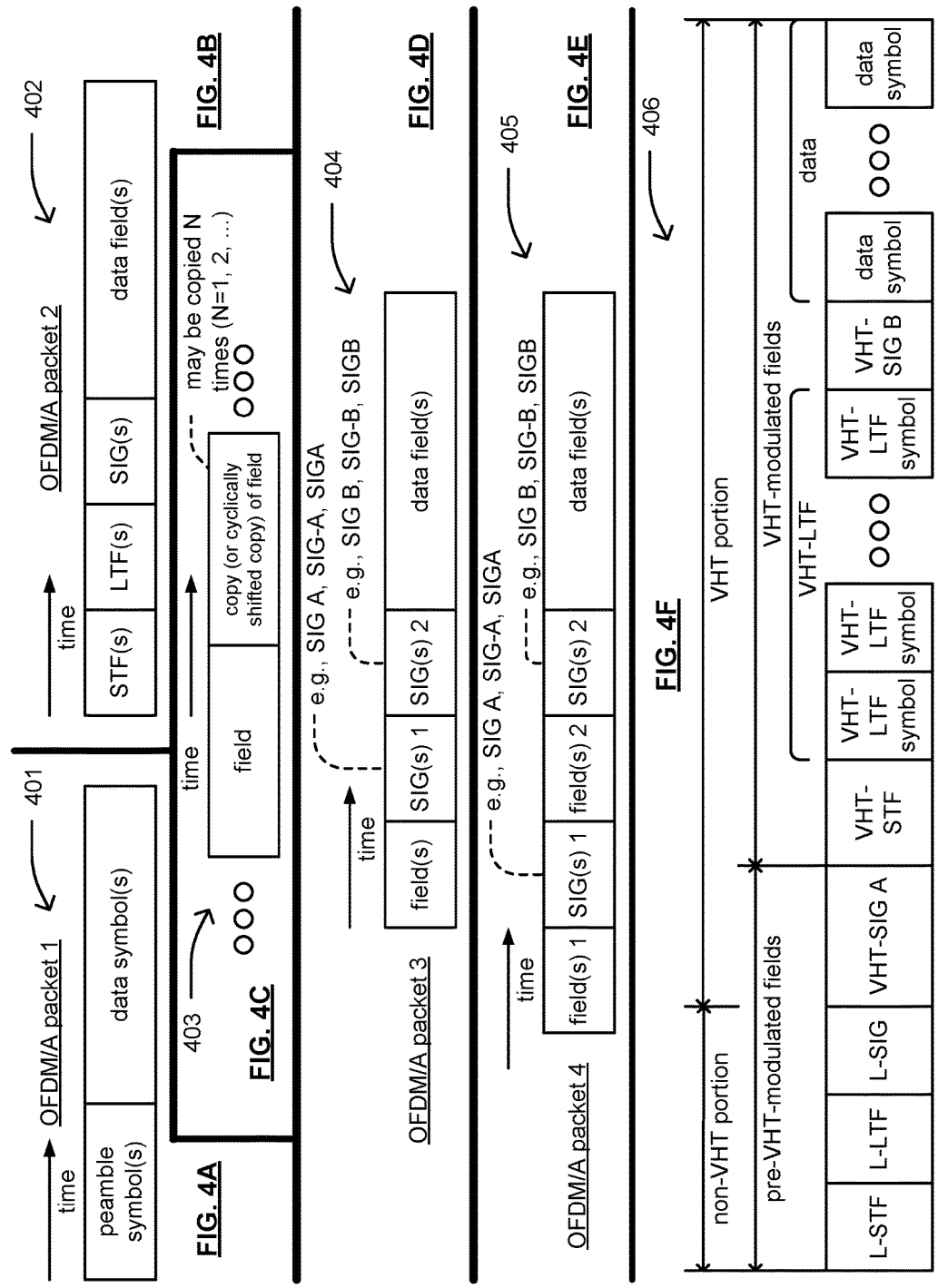

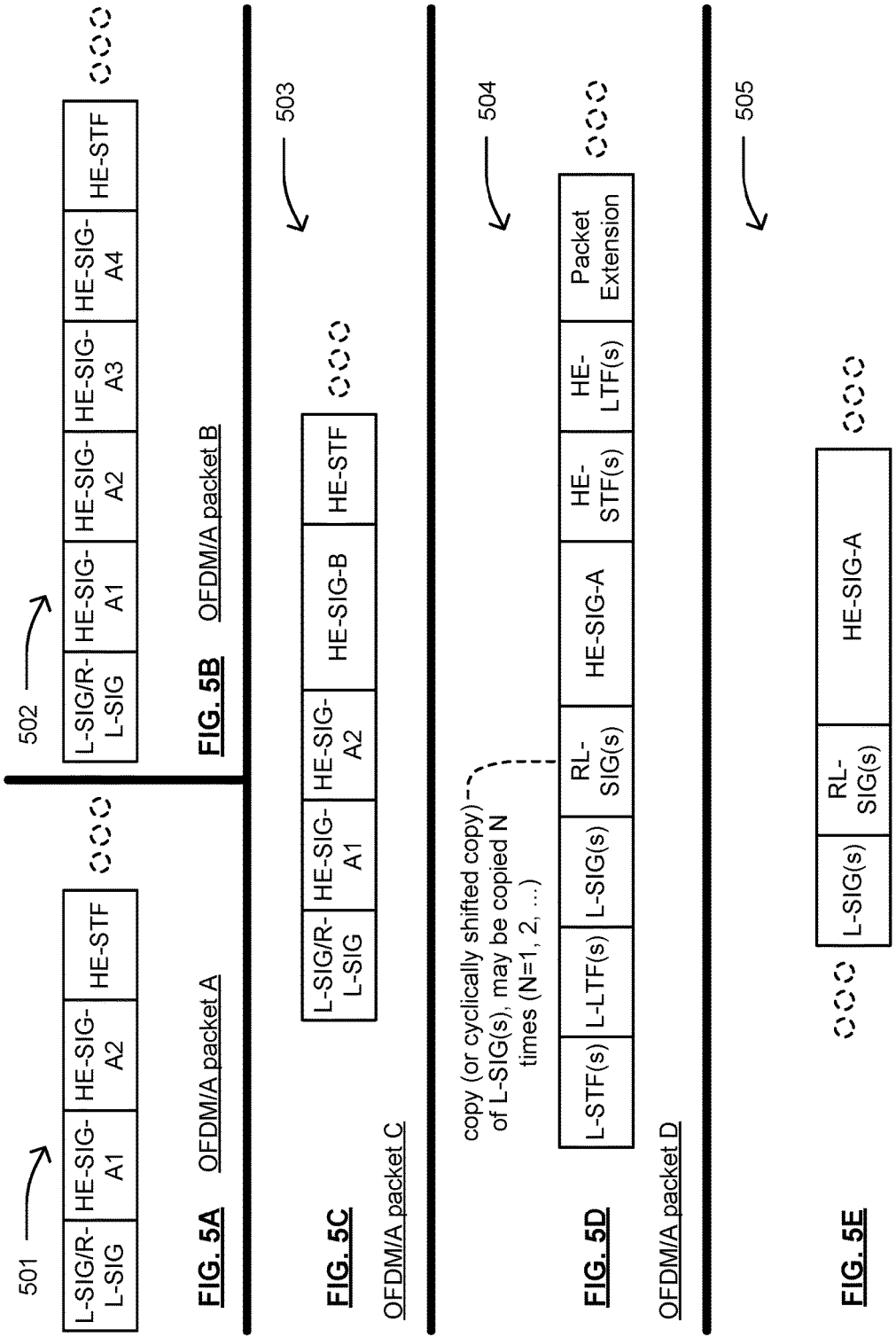

| Field | | #Bits |
|---|---|---|
| Downlink (DL)/Uplink (UL) | | 1 |
| Control | Format (Value=0) | 1 |
| Spatial reuse | Basic services set (BSS) color | 6 |
| | Interference level/clear channel assessment (CCA) level | 3 |
| | Interpretation | 1 |
| PLCP Protocol Data Unit (PPDU) information | Tx power | 3 |
| | Bandwidth (BW) | 2 |
| Fairness | Traffic class | 2 |
| Modulation, coding, beamforming (BF) | Modulation coding set (MCS) | 4 |
| | Cyclic prefix (CP) | 2 |
| | Coding | 2 |
| | Nsts (# spatial time streams) | 3 |
| | Space time block coding (STBC) | 1 |
| | TxBF | 1 |
| Padding + Signal extension | | 3 |
| Long training field (LTF) size | | 1 |
| Tail + cyclic redundancy check (CRC) | | 10 |
| Total | | 46 |

| Field | | #Bits |
|---|---|---|
| Downlink (DL)/Uplink (UL) | | 1 |
| Control | Format (Value=0) | 1 |
| Spatial reuse | Basic services set (BSS) color | 6 |
| | Interference level/clear channel assessment (CCA) level | 3 |
| | Interpretation | 1 |
| SIGB | Length | 4 |
| | Modulation coding set (MCS) | 2 |
| | Cyclic prefix (CP) | 1 |
| PLCP Protocol Data Unit (PPDU) information | Tx power | 3 |
| | Bandwidth (BW) | 4 |
| #Long training fields (LTFs) | | 3 |
| Long training field (LTF) size | | 1 |
| Data cyclic prefix (CP) | | 2 |
| Padding + Signal extension | | 3 |
| Wireless station (STA) identifier (ID)(STA-ID) size | | 2 |
| Tail + cyclic redundancy check (CRC) | | 10 |
| Total | | 47 |

| Field | | #Bits |
|---|---|---|
| Spatial reuse | BSS color | 6 |
| | Interpretation | 1 |
| Control | Format (value=1) | 1 |
| | Type (value=00) | 2 |
| Spatial reuse/sub-band | Interference level/CCA level | 3x4 |
| | Traffic class | 2x4 |
| PPDU information | BW | 4 |
| Tail + cyclic redundancy check (CRC) | | 10 |
| Total | | 44 |

FIG. 9B

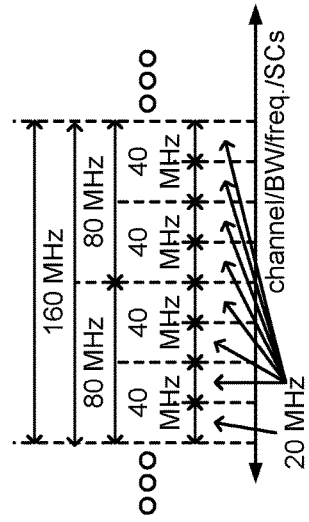

903 start generating a 1st signal that includes a field that specifies an acceptable interference level for concurrent communication for use by a 1st other WDEV to determine whether a transmission from the 1st other WDEV to a 2nd other WDEV acceptably or unacceptably interferes with another transmission from the WDEV 911 transmitting (e.g., via a communication interface of the WDEV) the 1st signal to a 3rd other WDEV via a communication channel 921 a 2nd signal is transmitted from the 1st other WDEV to the 2nd other WDEV via the communication channel and during transmission of at least a portion of the 1st signal from the WDEV when the 1st other WDEV determines that interference from the 2nd signal is less than or equal to the acceptable interference level for concurrent communication 923 end

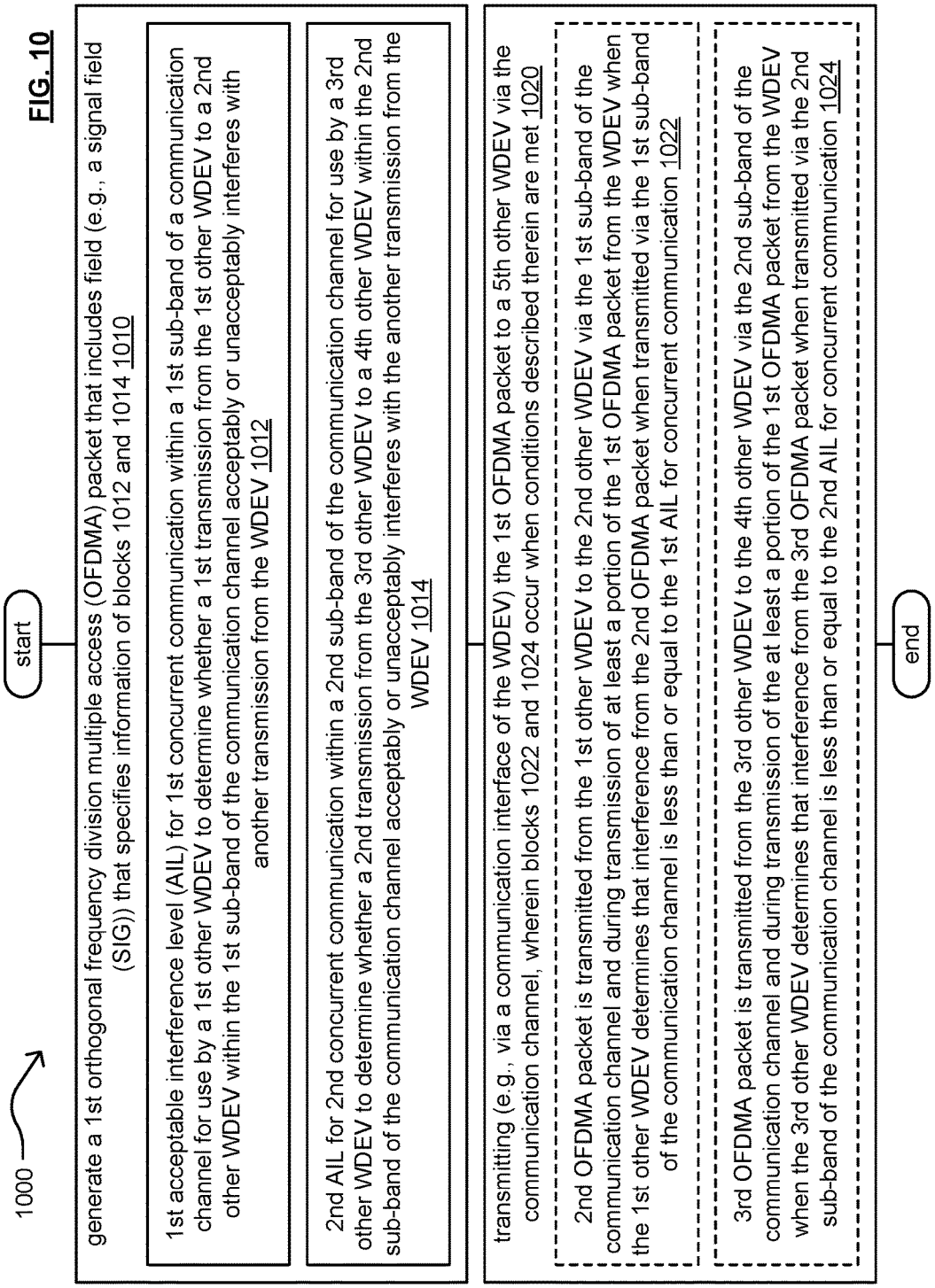

SIGNAL FIELD (SIG) DESIGN WITHIN OFDM/OFDMA WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. § 119(e) to U.S. Provisional Application No. 62/187,789, entitled "Signal field (SIG) design within OFDM/OFDMA wireless communications," filed Jul. 1, 2015; and U.S. Provisional Application No. 62/342,552, entitled "Signal field (SIG) design within OFDM/OFDMA wireless communications," filed May 27, 2016, both of which are hereby incorporated herein by reference in their entirety and made part of the present U.S. Utility patent application for all purposes.

CONTINUATION-IN-PART (CIP) PRIORITY CLAIMS, 35 U.S.C. § 120

The present U.S. Utility patent application also claims priority pursuant to 35 U.S.C. § 120, as a continuation-in-part (CIP), to the following U.S. Utility patent application which is hereby incorporated herein by reference in its entirety and made part of the present U.S. Utility patent application for all purposes, U.S. Utility patent application Ser. No. 14/192,228, entitled "Channel sharing within wireless communications," filed Feb. 27, 2014, pending, and scheduled subsequently to be issued as U.S. Pat. No. 9,379,837 on Jun. 28, 2016 (as indicated in an ISSUE NOTIFICATION mailed from the USPTO on Jun. 8, 2016), which claims priority pursuant to 35 U.S.C. § 119(e) to U.S. Provisional Application No. 61/804,718, entitled "Channel sharing within single user, multiple user, multiple access, and/or MIMO wireless communications," filed Mar. 24, 2013; U.S. Provisional Application No. 61/888,873, entitled "Channel sharing within wireless communications," filed Oct. 9, 2013; and U.S. Provisional Application No. 61/936,158, entitled "Channel sharing within wireless communications," filed Feb. 5, 2014, all of which are hereby incorporated herein by reference in their entirety and made part of the present U.S. Utility patent application for all purposes.

BACKGROUND

Technical Field

The present disclosure relates generally to communication systems; and, more particularly, to communications design within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

The number of wireless communication devices implemented and concurrently operative within wireless communication systems continues to increase and presents significant challenges for sharing the communication medium. The prior art does not provide adequate means by which multiple devices can operate efficiently within such communication systems.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of an OFDM/A packet.

FIG. 4B is a diagram illustrating another example of an OFDM/A packet of a second type.

FIG. 4C is a diagram illustrating an example of at least one portion of an OFDM/A packet of another type.

FIG. 4D is a diagram illustrating another example of an OFDM/A packet of a third type.

FIG. 4E is a diagram illustrating another example of an OFDM/A packet of a fourth type.

FIG. 4F is a diagram illustrating another example of an OFDM/A packet.

FIG. 5A is a diagram illustrating another example of an OFDM/A packet.

FIG. 5B is a diagram illustrating another example of an OFDM/A packet.

FIG. 5C is a diagram illustrating another example of an OFDM/A packet.

FIG. 5D is a diagram illustrating another example of an OFDM/A packet.

FIG. 5E is a diagram illustrating another example of an OFDM/A packet.

FIG. 8A is a diagram illustrating an example of content for various fields within an OFDM/A packet particularly for a signal field (SIG) (e.g., SIG-A) for use in single user (SU) communications.

FIG. 8B is a diagram illustrating an example of content for various fields within an OFDM/A packet particularly for a SIG (e.g., SIG-A) for use in multiple user (MU) communications.

FIG. 9A is a diagram illustrating an example of content for various fields within an OFDM/A packet particularly for a SIG (e.g., SIG-A) for use in uplink (UL) trigger-based frames.

FIG. 9B is a diagram illustrating an example of different channel bandwidths and relationship there between.

FIG. 9C is a diagram illustrating an embodiment of a method for execution by one or more wireless communication devices.

FIG. 10 is a diagram illustrating another embodiment of a method for execution by one or more wireless communication devices.

DETAILED DESCRIPTION

Figure 1:
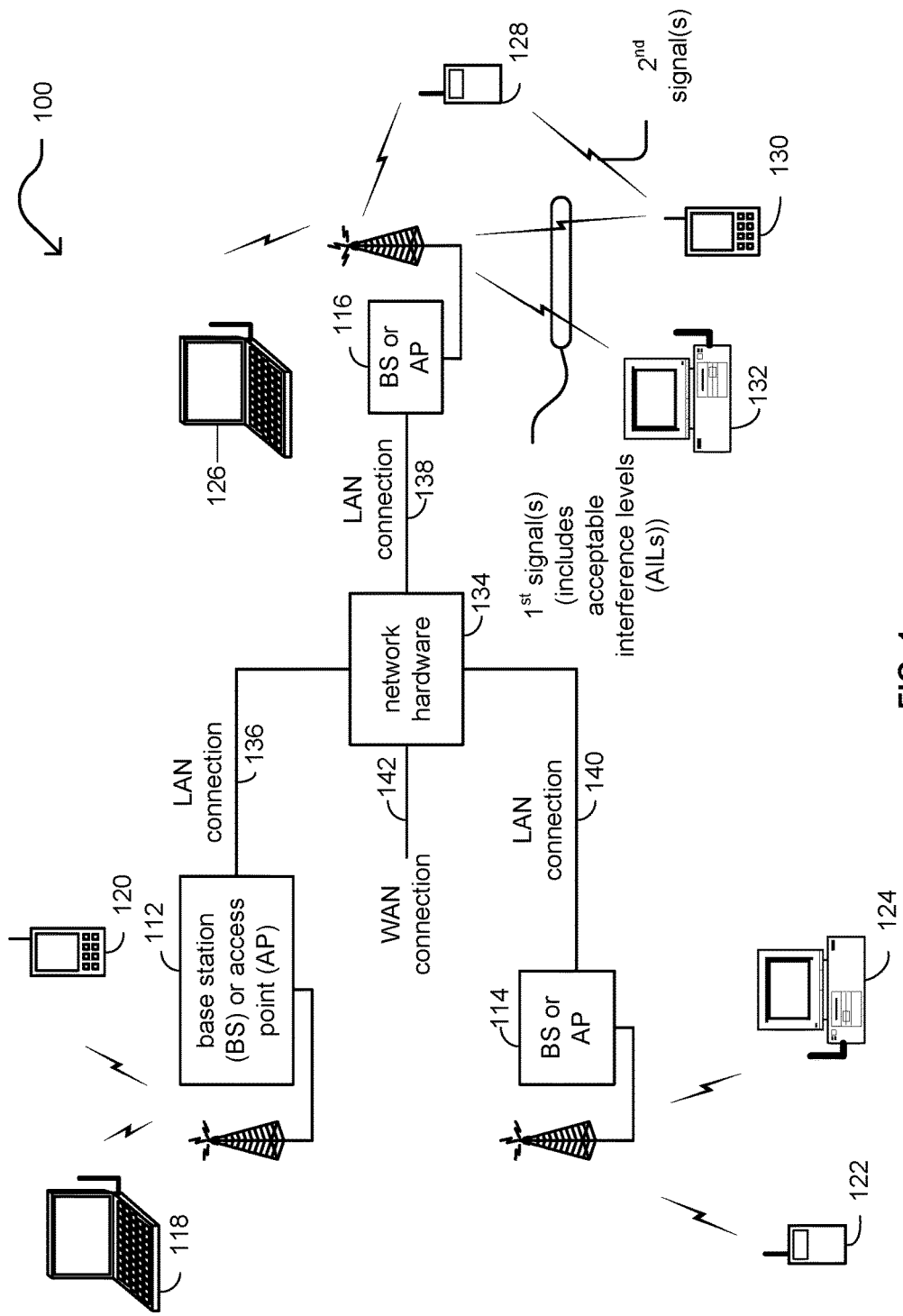
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, BS or AP 116 includes a processing circuitry that generates a first signal that includes a field that specifies an acceptable interference level for concurrent communication for use by WDEV 130 to determine whether a transmission from WDEV 130 to WDEV 128 acceptably or unacceptably interferes with another transmission from BS or AP 116. The BSs or APs 112-116 transmits the first signal to WDEV 132 via a communication channel. Then, a second signal is transmitted from the WDEV 130 to WDEV 128 via the communication channel and during transmission of at least a portion of the first signal from the BS or AP 116 when WDEV 130 determines that interference from the second signal is less than or equal to the acceptable interference level for concurrent communication.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of implementation and operation, WDEV 210 includes a processing circuitry that generates a first signal that includes a field that specifies an acceptable interference level for concurrent communication for use by WDEV 218 to determine whether a transmission from WDEV 218 to WDEV 224 acceptably or unacceptably interferes with another transmission from WDEV 210. The WDEV 210 transmits the first signal to WDEV 216 via a communication channel. Then, a second signal is transmitted from the WDEV 218 to WDEV 224 via the communication channel and during transmission of at least a portion of the first signal from the WDEV 210 when WDEV 218 determines that interference from the second signal is less than or equal to the acceptable interference level for concurrent communication.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennae, and WDEV 391 may include n antennae).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, one processing circuitry 330a may be implemented to include the processing circuitry 330, the communication interface 320 (including the TX 322 and/or RX 324 thereof), and the memory 340. Considering another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes processing circuitry 330a configured to perform various operations. Generally, such operations include generating, transmitting, etc. signals intended for one or more other devices (e.g., device 390 through 391) and receiving, processing, etc. other signals received for one or more other devices (e.g., device 390 through 391).

In some examples, note that the communication interface 320, which is coupled to the processing circuitry 330, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 310 may be communicated via any of these types of communication systems.

FIG. 2C is a diagram illustrating another example 203 of communication between wireless communication devices. At or during a first time (e.g., time 1 (ΔT1)), the WDEV 310 transmits signal(s) to WDEV 390, and/or the WDEV 390 transmits other signal(s) to WDEV 310. At or during a second time (e.g., time 2 (ΔT2)), the WDEV 310 processes signal(s) received from WDEV 390, and/or the WDEV 390 processes signal(s) received from WDEV 310.

In some examples, the signal(s) communicated between WDEV 310 and WDEV 390 may include field(s) that specifies (specify) acceptable interference level(a) for concurrent communications among the various WDEV 310, and WDEVs 390-391

In an example of implementation and operation, WDEV 310 generate a first signal that includes a field that specifies an acceptable interference level for concurrent communication for use by a WDEV 390 to determine whether a transmission from the WDEV 390 to a WDEV 391 acceptably or unacceptably interferes with another transmission from the wireless communication device. The 310 then transmits the first signal to a WDEV 392 (not specifically shown, but may be any other WDEV as described herein) via a communication channel, wherein a second signal is transmitted from the WDEV 390 to the WDEV 391 via the communication channel and during transmission of at least a portion of the first signal from the wireless communication device when the WDEV 390 determines that interference from the second signal is less than or equal to the acceptable interference level for concurrent communication.

In some examples, the field of the first signal specifies a first acceptable interference level for first concurrent communication within a first sub-band of the communication channel and a second acceptable interference level for second concurrent communication within a second sub-band of the communication channel. For example, a sub-band may be any sub-portion of a usable communication channel (e.g., a subset of sub-carriers of the communication channel such as with respect to FIG. 3A, 3B that may be assigned to different users, a sub-channel of the communication channel such as with respect to FIG. 9B such as 20 MHz communication channel of a larger 40 MHz communication channel or as 40 MHz communication channel of a larger 80 MHz communication channel and so on, etc.).

In some examples, the WDEV 310 transmits the first signal to the WDEV 392 (not specifically shown, but may be any other WDEV as described herein), wherein the WDEV 390 is permitted to transmit the second signal to the WDEV 391 within the first sub-band of the communication channel during the transmission of the at least a portion of the first signal from the wireless communication device when the WDEV 390 determines that interference from the second signal is less than or equal to the acceptable interference level for concurrent communication, and a WDEV 393 (not specifically shown, but may be any other WDEV as described herein) is permitted to transmit a third signal to a WDEV 394 (not specifically shown, but may be any other WDEV as described herein) within the second sub-band of the communication channel during the transmission of the at least a portion of the first signal from the wireless communication device when the WDEV 393 (not specifically shown, but may be any other WDEV as described herein) determines that interference from the second signal is less than or equal to the acceptable interference level for concurrent communication.

Also, in various examples, the first signal includes an orthogonal frequency division multiple access (OFDMA) packet, and the field within the OFDMA packet that specifies the acceptable interference level for concurrent communication includes a signal field (SIG) within the OFDMA packet. Also, in various other examples, the first signal includes an orthogonal frequency division multiple access (OFDMA) packet, and the field within the OFDMA packet that specifies the acceptable interference level for concurrent communication includes a first signal field (SIG) that is followed by a second SIG within the OFDMA packet.

Various examples of packets that may include a signal field (SIG), multiple SIGs, a first SIG and a second SIG (e.g., SIG-A, SIG-B) are described below.

In another example of implementation and operation, the WDEV 310 includes both a processing circuitry to perform many of the operations described above and also includes a communication interface, coupled to the processing circuitry, that is configured to support communications within a satellite communication system, a wireless communication system, a wired communication system, a fiber-optic communication system, and/or a mobile communication system. The processing circuitry is configured to transmit the first OFDMA packet and/or the second OFDMA packet to WDEV 390 and/or WDEV 391 via the communication interface.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 3A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processing circuitry and the communication interface (or alternatively a processing circuitry, such a processing circuitry 330a shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

FIG. 4A is a diagram illustrating an example 401 of an OFDM/A packet. This packet includes at least one preamble symbol followed by at least one data symbol. The at least one preamble symbol includes information for use in identifying, classifying, and/or categorizing the packet for appropriate processing.

FIG. 4B is a diagram illustrating another example 402 of an OFDM/A packet of a second type. This packet also includes a preamble and data. The preamble is composed of at least one short training field (STF), at least one long training field (LTF), and at least one signal field (SIG). The data is composed of at least one data field. In both this example 402 and the prior example 401, the at least one data symbol and/or the at least one data field may generally be referred to as the payload of the packet. Among other purposes, STFs and LTFs can be used to assist a device to identify that a frame is about to start, to synchronize timers, to select an antenna configuration, to set receiver gain, to set up certain the modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information. This disclosure presents, among other things, a means by which a variable length second at least one SIG can be used to include any desired amount of information. By using at least one SIG that is a variable length, different amounts of information may be specified therein to adapt for any situation.

Various examples are described below for possible designs of a preamble for use in wireless communications as described herein.

FIG. 4C is a diagram illustrating another example 403 of at least one portion of an OFDM/A packet of another type. A field within the packet may be copied one or more times therein (e.g., where N is the number of times that the field is copied, and N is any positive integer greater than or equal to one). This copy may be a cyclically shifted copy. The copy may be modified in other ways from the original from which the copy is made.

FIG. 4D is a diagram illustrating another example 404 of an OFDM/A packet of a third type. In this example 404, the OFDM/A packet includes one or more fields followed by one of more first signal fields (SIG(s) 1) followed by one of more second signal fields (SIG(s) 2) followed by and one or more data field.

FIG. 4E is a diagram illustrating another example 405 of an OFDM/A packet of a fourth type. In this example 405, the OFDM/A packet includes one or more first fields followed by one of more first signal fields (SIG(s) 1) followed by one or more second fields followed by one of more second signal fields (SIG(s) 2) followed by and one or more data field.

FIG. 4F is a diagram illustrating another example 406 of an OFDM/A packet. Such a general preamble format may be backward compatible with prior IEEE 802.11 prior standards, protocols, and/or recommended practices.

In this example 406, the OFDM/A packet includes a legacy portion (e.g., at least one legacy short training field (STF) shown as L-STF, legacy signal field (SIG) shown as L-SIG) and a first signal field (SIG) (e.g., VHT [Very High Throughput] SIG (shown as SIG-A)). Then, the OFDM/A packet includes one or more other VHT portions (e.g., VHT short training field (STF) shown as VHT-STF, one or more VHT long training fields (LTFs) shown as VHT-LTF, a second SIG (e.g., VHT SIG (shown as SIG-B)), and one or more data symbols.

Various diagrams below are shown that depict at least a portion (e.g., preamble) of various OFDM/A packet designs.

FIG. 5A is a diagram illustrating another example 501 of an OFDM/A packet. In this example 501, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1 e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a short training field (STF) based on a newer, developing, etc. communication standard, protocol, and/or recommended practice (shown as HE-STF, e.g., where HE again corresponds to high efficiency) followed by one or more fields.

FIG. 5B is a diagram illustrating another example 502 of an OFDM/A packet. In this example 502, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-AL e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-A3, e.g., where HE again corresponds to high efficiency) followed by a fourth at least one SIG based on a newer, developing, etc. communication standard, protocol, and/or recommended practice (shown as HE-SIG-A4, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields.

FIG. 5C is a diagram illustrating another example 502 of an OFDM/A packet. In this example 503, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-B, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields. This example 503 shows a distributed SIG design that includes a first at least one SIG-A (e.g., HE-SIG-A1 and HE-SIG-A2) and a second at least one SIG-B (e.g., HE-SIG-B).

FIG. 5D is a diagram illustrating another example 504 of an OFDM/A packet. This example 504 depicts a type of OFDM/A packet that includes a preamble and data. The preamble is composed of at least one short training field (STF), at least one long training field (LTF), and at least one signal field (SIG).

In this example 504, the preamble is composed of at least one short training field (STF) that corresponds to a prior or legacy communication standard, protocol, and/or recommended practice relative to a newer, developing, etc. communication standard, protocol, and/or recommended practice (shown as L-STF(s)) followed by at least one long training field (LTF) that corresponds to a prior or legacy communication standard, protocol, and/or recommended practice relative to a newer, developing, etc. communication standard, protocol, and/or recommended practice (shown as L-LTF(s)) followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by another at least one STF based on a newer, developing, etc. communication standard, protocol, and/or recommended practice (shown as HE-STF(s), e.g., where HE again corresponds to high efficiency) followed by another at least one LTF based on a newer, developing, etc. communication standard, protocol, and/or recommended practice (shown as HE-LTF(s), e.g., where HE again corresponds to high efficiency) followed by at least one packet extension followed by one or more fields.

FIG. 5E is a diagram illustrating another example 505 of an OFDM/A packet. In this example 505, the preamble is composed of at least one field followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by one or more fields.

Note that information included in the various fields in the various examples provided herein may be encoded using various encoders. In some examples, two independent binary convolutional code (BCC) encoders are implemented to encode information corresponding to different respective modulation coding sets (MCSs) that are can be selected and/or optimized with respect to, among other things, the respective payload on the respective channel. Various communication channel examples are described with respect to FIG. 9B below.

Also, in some examples, a wireless communication device generates content that is included in the various SIGs (e.g., SIGA and/or SIGB) to signal MCS(s) to one or more other wireless communication devices to instruct which MCS(s) for those one or more other wireless communication devices to use with respect to one or more communications. In addition, in some examples, content included in a first at least one SIG (e.g., SIGA) include information to specify at least one operational parameter for use in processing a second at least one SIG (e.g., SIGB) within the same OFDM/A packet.

Various OFDM/A frame structures are presented herein for use in communications between wireless communication devices and specifically showing OFDM/A frame structures corresponding to one or more resource units (RUs). Such OFDM/A frame structures may include one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

This disclosure presents, among other things, a detailed signal field (SIG) design (e.g., such as within SIG(s) 1, SIG-A, and/or other SIG design as with reference to the various prior diagrams). In certain examples, two (2) symbols are used for single user (SU), multiple user (MU), and Uplink (UL) trigger-based frames. This disclosure presents, among other things, a design and/or specification for the bits for each frame type in various examples.

Figure 6A:
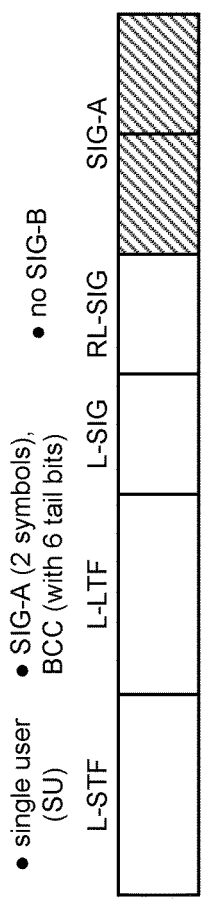
FIG. 6A is a diagram illustrating another example of an OFDM/A packet.

FIG. 6A is a diagram illustrating another example 601 of an OFDM/A packet. In this diagram, SIG-A includes 2 symbols with binary convolutional code (BCC) (with 6 tail bits). This diagram includes no SIG-B.

Figure 6B:
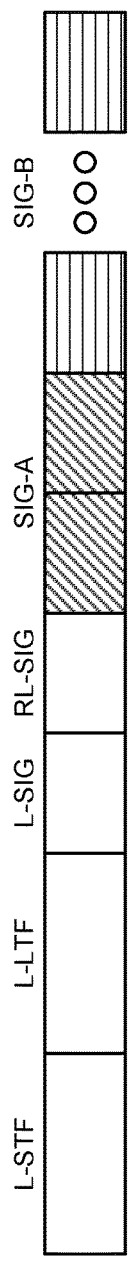
FIG. 6B is a diagram illustrating another example of an OFDM/A packet.

FIG. 6B is a diagram illustrating another example 602 of an OFDM/A packet. In this diagram, SIG-A include 2 symbols with BCC (with 6 tail bits). Another SIG (e.g., SIG-B) includes a variable number of symbols (e.g., selectable and different among different respective packets, etc.), a variable modulation coding set (MCS), Cyclic prefix (CP).

Figure 6C:
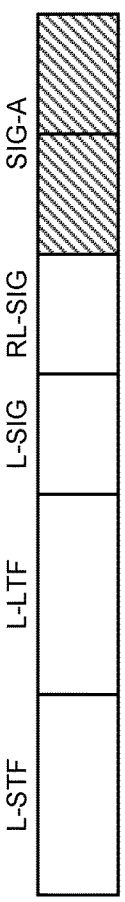
FIG. 6C is a diagram illustrating another example of an OFDM/A packet.

FIG. 6C is a diagram illustrating another example 603 of an OFDM/A packet. This diagram includes no SIG-B. In this diagram, information regarding spatial reuse/fairness etc. may be included. This diagram proposes that SIG-A has two symbols, BCC (with 6 tail bits).

Some of the diagrams herein depict multiple wireless communication devices. Certain examples include 4 separate wireless communication devices (WDEVs). These devices may be referred to as a first wireless communication device or wireless communication device A (WDEV_A), a second wireless communication device or wireless communication device B (WDEV_B), a third wireless communication device or wireless communication device C (WDEV_C), and a fourth wireless communication device or wireless communication device D (WDEV_D). Alternatively, for brevity, such a wireless communication device made be simply referred to as 'device' (e.g., as in device A, device B, device C, and device D).

This disclosure presents, among other things, novel rules that allow concurrent transmissions to take place even while a device is hearing, receiving, and decoding other transmissions. This can increase WiFi aggregate throughput in a given area. While current WiFi communication standards, protocols, and recommended practices mandate a device that decodes a packet to stay silent for the duration of that packet, this disclosure presents, among other things, new methods that allow for more aggressive spatial reuse such that devices can simultaneously transmit if they do not interfere too strongly with each other.

Note that current IEEE 802.11 related standards, specifications, protocols, etc. disallow a $3^{rd}$ party device from transmitting on top of or during any packet which it receives at a power above specified thresholds. However, a device may be configured to perform selective transmission can be based on any or all of certain considerations. A device may be configured to perform observation of previous frames, such as by including levels at which it receives other frames (including frames addressed to other devices). A device may also be configured to use information extracted from frames, frame headers, and link setup frames, such as by using some information that already exists in current frame headers, RTS/CTS frames, and/or other frames. Additional information may be included to be added to headers and/or other frames (e.g., such as indicating to which BSS a frame belongs to, the frame duration, etc.). Such rules may be fixed, or may be dynamically set by a given device (e.g., an AP) and other devices associated with it. The given device (e.g., AP) may observe interference conditions and determine an appropriate collision resolution signaling (CRS) threshold based on those observed interference conditions. This value may then be communicated from the AP to its associated STAs.

Figure 7A:
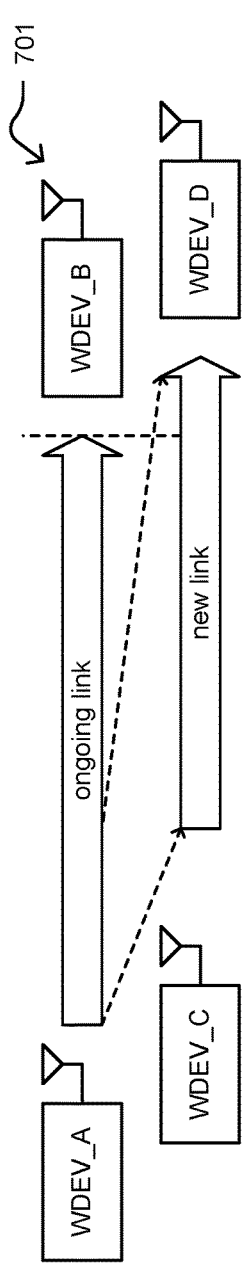
FIG. 7A is a diagram illustrating another example of communication between wireless communication devices.

FIG. 7A is a diagram illustrating another example 701 of communication between wireless communication devices. A begins transmitting a frame to B, and another device (e.g., C) decodes the header of A→B frame, and may have decoded prior frames sent by A and/or B (e.g., RTS/CTS preceding A→B data frame). Under current rules, if C successfully decodes A→B header, then C backs off for the duration of that frame. In some instances, an additional consideration may be made such that if C successfully decodes A→B header particularly at a power level above −82 dBm for 20 MHz transmission (e.g., the carrier sense (CRS) threshold), then C backs off for the duration of that frame. Novel mechanisms presented herein allow C to transmit on top of the ongoing A→B transmission under certain conditions.

Examples of concurrent transmission parameters may include one or more of the following: modulation coding set (MCS) of A→B link, interference margin of A→B: maximum interference level that B can accept while still being able to decode A→B frame, interference allowed/disallowed bit (e.g., if this bit is set and other conditions are satisfied, a nearby device may be allowed to transmit), CRS threshold, frame type (e.g., management vs. data frame), frame length, # of spatial streams in A→B streams, # of TX antennas at A, # of RX antennas at B, frame bandwidth, uplink vs. downlink indication, basic services set (BSS) identifier (ID), power at which B receives frames from A, transmit power, IDs of transmitting and/or receiving device, whether or not A→B frame will be acknowledged (e.g., ACK policy bits are already in MAC header, but may be replicated in PHY header), etc. Note that these listed concurrent transmission parameters are exemplary, and additional or different one or more concurrent transmission parameters may be used in different instances.

With respect to CRS threshold, an overhearing/listening/detecting device may be allowed to transmit on-top of A→B if the A→B frame and/or other A/B frames are received at a power level below this threshold. This threshold may be dynamically adjusted (e.g., on a per-frame basis or on a slower time scale) or could be fixed in a certain neighborhood or for a particular link. A device selecting a particular CRS threshold value may be required to satisfy certain rules in subsequent time periods, e.g., if device A transmits a frame with CRS threshold=−92 dBm, for a prescribed period of time after that device A may be required to use a CRS threshold less than or equal to −92 dBm when evaluating medium occupancy.

A BSS ID indicates to which BSS the frame belongs. A full BSSID could be sent, or a shorter, hash-function of the BSSID could be sent. Instead of sending full BSSID or a hash of BSSID, each BSS can choose one of a small set of colors to represent its ID, and bits associated with this color can be signaled. Messaging can be performed between nearby BSSs to make it likely that all BSSs within hearing distance of each other use different colors, so that their transmissions are distinguishable from one another. One possible use of such color bits is to use one set of rules for concurrent transmission when the color of the A→B transmission matches the color of device C, and another set of rules when the color is different. For example, if the color matches and the A→B header is successfully decoded, then no concurrent transmission is allowed; if the color does not match and the A→B header is successfully decoded and received at a power level below some threshold, then concurrent transmission is allowed. The premise of such an approach is that only a single transmission is typically possible within a single BSS.

The transmit power is that used by the transmitting station (e.g., device A). Broadcasting the transmit power of an ongoing transmission can allow other devices that overhear this transmission to determine the power level at which they will arrive at the transmitter of the ongoing link. If device A transmits a packet with power P_TX-A, device C receives that packet at power P_RX-C=P_TX-A−P_AC, where P_AC is the path loss (in dB) between A and C. The path loss between A-C and C-A is the same, so device A will receive a packet transmitted by device C with power P_TX-C at power level P_RX-A=P_TX-C−P_AC. Therefore, P_RX-A=P_RX-C+(P_TX-C−P_TX-A). Device C can measure P_RX-C when it receives a packet from A, device C knows P_TX-C, and device C can learn P_TX-A if it is signaled.

The IDs of transmitting and/or receiving device maybe contained in the MAC header of data frames, but these ID's or some reduced-bit hashed version of the ID's may also be added to the PHY header. Other information can also be embedded in A→B frame header or in prior AB frames that can potentially be used by nearby devices to enable on-top transmission. With respect to duration, device A knows that, for the duration of its packet transmission, other devices can transmit because the recipient device B already reserved the channel via a CTS or a trigger/sync frame used (e.g., uplink (UL) orthogonal frequency division multiple access (OFDMA) or UL Multiple user (MU) transmissions). In this case device A only wants to protect the following ACK transmission from device B to device A and may then allow other transmission for the duration of the packet. The SIG in that case signals that transmissions are allowed only for the duration of the packet.

Such information described above could be conveyed in the physical layer (PHY) signal fields or in media access control (MAC) header fields using the standard encoding techniques, or could be conveyed by varying certain aspects of the PHY preamble. For example, a long training field (LTF) sequence could be modulated by one of N spreading codes, in order to convey log 2(N) bits of information. A receiver (RX) does not previously know which of the spreading sequences is used, so RX must process LTF and estimate which spreading sequence was used. This could be used for the BSSID "color" described above, or for any other information type. An additional cyclic redundancy check (CRC) may be added to the PHY payload covering only the MAC header, so that a decoding device can immediately determine whether or not it has decoded the MAC header correctly.

Also, different methods may be employed to incentivize A→B frame to set certain information fields to values that assist spatial reuse by nearby devices. If device A indicates a large interference margin in A→B frame, device A may be allowed to more aggressively transmit on top of other transmissions in a subsequent time period. Links that set the 'interfere with me' bit may be allowed to use a lower CRS threshold.

The A→B link may choose to use a deferred response to avoid high interference on the B→A link (e.g., due to C→D). For example, A may solicit response from B when A's medium becomes clear. Nearby devices may be allowed to interfere with A→B based on various consideration as follows: information values conveyed in A→B header and other A/B frames, power at which A→B header and other A/B frames are received (e.g., if C receives A→B header at power level below CRS threshold indicated in A→B header, C is in a different BSS than A, and no other interference conditions are specified in A→B header, then C can transmit (interfere)), rules broadcast by APs, and/or handshake agreements made between APs and/or devices.

Nearby devices may be allowed to interfere with A→B without conditions, or if their transmission meets prescribed conditions or compares favorably with some combination of the following parameters: transmit power, bandwidth (BW), # of spatial streams, and/or length.

For example, C decodes A→B header, and rules allow C to transmit a 20 MHz packet with 1 or 2 spatial streams with up to 10 dBm transmit power. In other scenarios C decodes A→B header and rules allow C to transmit a packet without any constraints.

Also, one or more concurrent transmission parameters may indicate that those devices that are allowed to transmit on top of A→B may be required to complete their frames before the end of the A→B frame. This will reduce interference to the B→A immediate response. The A→B packet duration may be signaled in the standard L-SIG symbol. Under certain conditions, these devices may be allowed to transmit beyond A→B frame (e.g., if device B is not going to send an immediate response, or if the on-top transmitter determines that it will not cause strong interference to A).

Rules for exactly when new interfering link (C→D in picture) must begin transmission may be specified (e.g., concurrent transmission start and/or end times), to allow device B to know when to expect interference. More than one possible start time may be allowed (e.g., immediately after PHY header, or 2 OFDM symbols later). An interferer (e.g., C) may also be required to exactly synch its symbol timing and carrier frequency offset to match A→B transmission. The A→B frame may contain some empty frames, to allow B to estimate the channel (C→B) and properties of interfering transmissions. The interferer (e.g., C) may be required to use a different LTF sequence from the A→B link so that B can differentiate the LTF coming from C from data symbols sent by A.

Generally speaking, a transmission begins from device A to B (e.g., from WDEV_A to WDEV_B). Communications described from A to B (or A→B) may be understood as being from WDEV_A to WDEV_B. Similar suffix conventions may be used as well (e.g., communications described from C to D may be understood as being from WDEV_C to WDEV_D, and so on). Nearby devices such as device C (and not devices A/B) will begin decoding the A→B signal (packet or frame), and these nearby devices may also have decoded frames that were optionally used to setup the A→B link (e.g., a request to send/clear to send (RTS/CTS) exchange). The setup frames and/or the headers (PHY & MAC) in the A→B frame contain information that allow such a nearby device to determine various things such as (a) how interference resilient the A→B frame is, and (b) how strongly this device will interfere with the A→B link if it begins transmitting. Some of this "information" will already be contained in standard frame headers and certain exchanged frames (e.g., RTS/CTS frames). Based on above information it has extracted from the A→B header and other frames, plus the power at which it received the A→B header and of other frames, a nearby device C may begin transmitting (on top of, i.e., simultaneously to, the A→B link) to another nearby device D, possibly subject to certain conditions.

A processor within device C may be configured to process the first signal to determine the one or more concurrent transmission parameters that includes a concurrent transmission start time. The information determined based on the first signal may indicate a particular time at which the device C should began its concurrent transmission. The processor within device C may then be configured direct the communication interface to transmit the second signal during receipt of the first signal and to begin transmission of the first signal based on the concurrent transmission start time. In some instances, the one or more concurrent transmission parameters may include a concurrent transmission end time that indicates when the concurrent transmission should end.

Figure 7B:
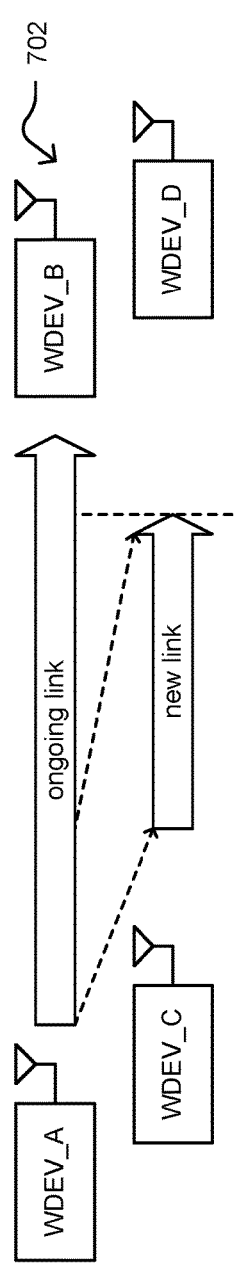
FIG. 7B is a diagram illustrating another example of communication between wireless communication devices.

FIG. 7B is a diagram illustrating another example 702 of communication between wireless communication devices. This diagram shows that the concurrent transmission from device C to D ends before the transmission from device A to B.

Figure 7C:
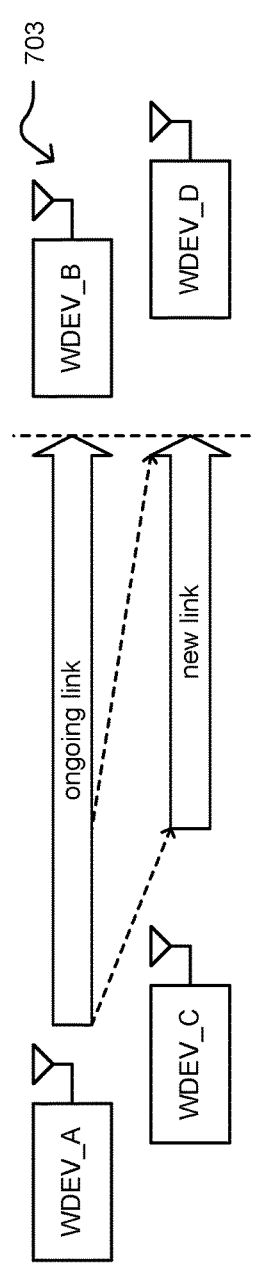
FIG. 7C is a diagram illustrating another example of communication between wireless communication devices.

FIG. 7C is a diagram illustrating another example 703 of communication between wireless communication devices. This diagram shows that the concurrent transmission from device C to D ends at the same time as the transmission from device A to B.

Referring back to FIG. 7A, that diagram shows that the concurrent transmission from device C to D ends after the transmission from device A to B. Concurrent transmission start and end times are just some examples of concurrent transmission parameters that may be determined based on the first signal transmitted from device A to B.

Transmission power considerations may also be made. For example, consider that device C overhears the A→B header and determines that if it transmits with 10 dBm power because such a transmission will cause negligible interference to A and B, and then device C may begin a transmission to some other device D. In another example, consider that device C has previously reached an agreement with device A that allows C to transmit on top of any A transmission (e.g., such as during some prior frame exchange between those devices, such as an RTS/CTS frame exchange). Then, device C overhears A→B header, and device C is allowed to transmit based on this agreement, and thus C begins transmitting to D.

The following describes various fields that are shown and used in various signal field (SIG) examples provided herein including those such as with respect to FIG. 8A, FIG. 8B, and FIG. 9A. For example, such description may be applicable for packet, field, etc. design for bits for spatial reuse/fairness/PLCP Protocol Data Unit (PPDU) information.

CCA level—3 bits e.g. −95:5:−65 dBm. This field allows device C to transmit if the received preamble from device A is at or below the specified level. In this example, the value of the CCA level included in the frame is the value of the CCA used by device A to establish medium idle before transmission of his frame—this is done for fairness in application and access to the com medium, if a device is aggressive in accessing the medium he should accept similar behavior.

Interference level—same 3 bits—this field allows device C to transmit if its transmission will arrive at device A at or below the specified level. This example implicitly assumes roughly similar path loss between C and A and C and B. The following field may be used as well.

Transmit (TX) power—3 bits (in a particular range such as of e.g., 0 dBm to 30 dBm)—this allows C to calculate the path loss to A and consequently the interference level that it will create. Mostly useful for transmissions overlapping UL transmissions to an OBSS AP or DL to one STA.

Interpretation—1 bit to switch between the CCA/interference level options.

Traffic class—3 bits. An example proposes to move this field to the PHY header to enable devices to more reliably and easily monitor the on-air traffic class and compare it to its pending Tx class to determine if it is being "cheated" out of its fair share. Based on the observed traffic class the device can modify medium access parameters (EDCA, CCA, etc.) within limits specified by the AP.

Immediate response bit—1 bit. It changes the definition of the following:

There is an immediate response PPDU (e.g. trigger frame or RTS/CTS exchange) and the CCA/interference levels apply to that transmission. Meaning the Tx is allowing node C to transmit on top of the response PPDU.

Transmission opportunity (TXOP) duration field—becomes duration of next PPDU and enables node C to know the start and end time of the response PPDU.

FIG. 8A is a diagram illustrating an example 801 of content for various fields within an OFDM/A packet particularly for a signal field (SIG) (e.g., SIG-A) for use in single user (SU) communications. This diagram shows an example of contents for signal field (SIG) design (e.g., such as within SIG(s) 1, SIG-A, and/or other SIG design as with reference to the various prior diagrams) for single user (SU) application. The SIG-A include 2 symbols BCC. With respect to whether or not the packet is single user (SU) or multiple user (MU), the SU/MU is signaled using QBPSK rotation (e.g., binary phase shift keying (BPSK) rotated quadrature, 90 degrees) on SIG-A2 (e.g., another SIG field that is different than a first SIG, such as a SIG-A1).

Explanation of format bit is as follows: (1) For SU/MU: format=0; (2) For UL trigger based/future use: format=1.

FIG. 8B is a diagram illustrating an example 802 of content for various fields within an OFDM/A packet particularly for a SIG (e.g., SIG-A) for use in multiple user (MU) communications. This diagram shows an example of contents for signal field (SIG) design (e.g., such as within SIG(s) 1, SIG-A, and/or other SIG design as with reference to the various prior diagrams) for single user (SU) application. This table shows how to signal explicitly SIG-B length/MCS/CP. SIG-B can signal more refined spatial reuse bits per sub-band (or per sub-channel, sub-carrier, etc.). Similar to the bits defined in Uplink (UL) trigger-based frames as described below. With respect to whether or not the packet is single user (SU) or multiple user (MU), SU/MU signaled using QBPSK on SIG-A2 (e.g., another SIG field that is different than a first SIG, such as a SIG-A1).

Explanation of format bit is as follows: (1) For SU/MU: format=0; and (2) For UL trigger based/future use: format=1.

FIG. 9A is a diagram illustrating an example 901 of content for various fields within an OFDM/A packet particularly for a SIG (e.g., SIG-A) for use in uplink (UL) trigger-based frames. No SIG-B in included in such example UL trigger-based frames. Only need information regarding spatial reuse/bandwidth etc.

Explanation of format and type bits is as follows: (1) For SU/MU: format=0; (2) For UL trigger based: format=1 & Type=00; (3) Format=1 & Type=01/10/11 are reserved for future use. SIG-A signals refined spatial reuse bits for multiple sub-bands. For example, Sub-band definition may be made based on bandwidth, sub-carriers, channel, band, etc. This example proposes signaling for 4 sub-bands, bandwidths, sub-carriers, channels, etc.

FIG. 9B is a diagram illustrating an example 902 of different channel bandwidths and relationship there between. In one example, a device (e.g., the device 310) is configured to generate and transmit any OFDMA packet based on any of a number of OFDMA frame structures within various communication channels having various channel bandwidths. For example, a 160 MHz channel may be subdivided into two 80 MHz channels. An 80 MHz channel may be subdivided into two 40 MHz channels. A 40 MHz channel may be subdivided into two 20 MHz channels. Note also such channels may be located within the same frequency band, the same frequency sub-band or alternatively among different frequency bands, different frequency sub-bands, etc.

FIG. 9C is a diagram illustrating an embodiment of a method 903 for execution by one or more wireless communication devices. The method 903 begins by generating a first signal that includes a field that specifies an acceptable interference level for concurrent communication for use by a first other wireless communication device to determine whether a transmission from the first other wireless communication device to a second other wireless communication device acceptably or unacceptably interferes with another transmission from the wireless communication device (block 911).

The method 903 continues by transmitting (e.g., via a communication interface of the wireless communication device) the first signal to a third other wireless communication device via a communication channel (block 921). In some examples, a second signal is transmitted from the first other wireless communication device to the second other wireless communication device via the communication channel and during transmission of at least a portion of the first signal from the wireless communication device when the first other wireless communication device determines that interference from the second signal is less than or equal to the acceptable interference level for concurrent communication (block 923).

FIG. 10 is a diagram illustrating another embodiment of a method 1000 for execution by one or more wireless communication devices.

The method 1000 begins by generating a first orthogonal frequency division multiple access (OFDMA) packet that includes a signal field (SIG) that specifies information shown in blocks 1012 and 1014 (block 1010).

For example, the OFDMA packet generated in block 1010 includes a first acceptable interference level (AIL) for first concurrent communication within a first sub-band of a communication channel for use by a first other wireless communication device to determine whether a first transmission from the first other wireless communication device to a second other wireless communication device within the first sub-band of the communication channel acceptably or unacceptably interferes with another transmission from the wireless communication device (block 1012). For example, the OFDMA packet generated in block 1010 includes a second AIL for second concurrent communication within a second sub-band of the communication channel for use by a third other wireless communication device to determine whether a second transmission from the third other wireless communication device to a fourth other wireless communication device within the second sub-band of the communication channel acceptably or unacceptably interferes with the another transmission from the wireless communication device (block 1014).

The method 1000 continues by transmitting (e.g., via a communication interface of the wireless communication device) the first OFDMA packet to a fifth other wireless communication device via the communication channel (block 1020). In some examples, the operations of the blocks 1022 and 1024 occur when certain conditions are met.

In some examples, a second OFDMA packet is transmitted from the first other wireless communication device to the second other wireless communication device via the first sub-band of the communication channel and during transmission of at least a portion of the first OFDMA packet from the wireless communication device when the first other wireless communication device determines that interference from the second OFDMA packet when transmitted via the first sub-band of the communication channel is less than or equal to the first AIL for concurrent communication (block 1022).

Also, in some examples, a third OFDMA packet is transmitted from the third other wireless communication device to the fourth other wireless communication device via the second sub-band of the communication channel and during transmission of the at least a portion of the first OFDMA packet from the wireless communication device when the third other wireless communication device determines that interference from the third OFDMA packet when transmitted via the second sub-band of the communication channel is less than or equal to the second AIL for concurrent communication (block 1024).

It is noted that the various operations and functions described within various methods herein may be performed within a wireless communication device (e.g., such as by the processing circuitry 330, communication interface 320, and memory 340 or processing circuitry 330a such as described with reference to FIG. 2B) and/or other components therein. Generally, a communication interface and processing circuitry (or alternatively a processing circuitry that includes communication interface functionality, components, circuitry, etc.) in a wireless communication device can perform such operations.

Examples of some components may include one of more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:
1. A wireless communication device comprising:
a communication interface; and
processing circuitry that is coupled to the communication interface, wherein at least one of the communication interface or the processing circuitry configured to:
generate a first signal that includes a field that specifies an acceptable interference level for concurrent communication for use by a first other wireless communication device to determine whether a transmission from the first other wireless communication device to a second other wireless communication device acceptably or unacceptably interferes with another transmission from the wireless communication device, wherein the field specifies a first acceptable interference level for first concurrent communication within a first sub-band of a communication channel and a second acceptable interference level for second concurrent communication within a second sub-band of the communication channel;
transmit the first signal to a third other wireless communication device via the communication channel, wherein a second signal is transmitted from the first other wireless communication device to the second other wireless communication device via the communication channel and during transmission of at least a portion of the first signal from the wireless communication device when the first other wireless communication device determines that interference from the second signal is less than or equal to the acceptable interference level for concurrent communication; and
transmit the first signal to the third other wireless communication device, wherein the first other wireless communication device is permitted to transmit the second signal to the second other wireless communication device within the first sub-band of the communication channel during the transmission of the at least a portion of the first signal from the wireless communication device when the first other wireless communication device determines that interference from the second signal is less than or equal to the acceptable interference level for concurrent communication, and wherein a fourth other wireless communication device is permitted to transmit a third signal to a fifth other wireless communication device within the second sub-band of the communication channel during the transmission of the at least a portion of the first signal from the wireless communication device when the fourth other wireless communication device determines that interference from the second signal is less than or equal to the acceptable interference level for concurrent communication.

2. The wireless communication device of claim 1, wherein at least one of the wireless communication device, the first other wireless communication device, the second other wireless communication device, or the third other wireless communication device, the fourth other wireless communication device, or the fifth other wireless communication device includes a laptop computer, a tablet, a personal digital assistant, a personal computer, or a cellular telephone.

3. The wireless communication device of claim 1 further comprising:
a wireless station (STA), wherein at least one of the first other wireless communication device, the second other wireless communication device, the third other wireless communication device, the fourth other wireless communication device, or the fifth other wireless communication device includes another STA.

4. The wireless communication device of claim 1, wherein the second other wireless communication device is the wireless communication device, and the fifth other wireless communication device is the wireless communication device.

5. The wireless communication device of claim 1, wherein the first signal includes an orthogonal frequency division multiple access (OFDMA) packet, and the field within the OFDMA packet that specifies the acceptable interference level for concurrent communication includes a signal field (SIG) within the OFDMA packet.

6. The wireless communication device of claim 1, wherein the first signal includes an orthogonal frequency division multiple access (OFDMA) packet, and the field within the OFDMA packet that specifies the acceptable interference level for concurrent communication includes a first signal field (SIG) that is followed by a second SIG within the OFDMA packet.

7. The wireless communication device of claim 1 further comprising:
the communication interface configured to support communications within at least one of a satellite communication system, a wireless communication system, a wired communication system, a fiber-optic communication system, or a mobile communication system; and
the processing circuitry configured to transmit the first signal via the communication interface.

8. The wireless communication device of claim 1 further comprising:
an access point (AP), wherein the at least one of the first other wireless communication device, the second other wireless communication device, or the third other wireless communication device includes a wireless station (STA).

9. A wireless communication device comprising:
a communication interface; and
processing circuitry that is coupled to the communication interface, wherein at least one of the communication interface or the processing circuitry configured to:
generate a first orthogonal frequency division multiple access (OFDMA) packet that includes a signal field (SIG) that specifies a first acceptable interference level for first concurrent communication within a first sub-band of a communication channel for use by a first other wireless communication device to determine whether a first transmission from the first other wireless communication device to a second other wireless communication device within the first sub-band of the communication channel acceptably or unacceptably interferes with another transmission from the wireless communication device and a second acceptable interference level for second concurrent communication within a second sub-band of the communication channel for use by a third other wireless communication device to determine whether a second transmission from the third other wireless communication device to a fourth other wireless communication device within the second sub-band of the communication channel acceptably or unacceptably interferes with the another transmission from the wireless communication device; and
transmit the first OFDMA packet to a fifth other wireless communication device via the communication channel, wherein at least one of a second OFDMA packet is transmitted from the first other wireless communication device to the second other wireless communication device via the first sub-band of the communication channel and during transmission of at least a portion of the first OFDMA packet from the wireless communication device when the first other wireless communication device determines that interference from the second OFDMA packet when transmitted via the first sub-band of the communication channel is less than or equal to the first acceptable interference level for concurrent communication or a third OFDMA packet is transmitted from the third other wireless communication device to the fourth other wireless communication device via the second sub-band of the communication channel and during transmission of the at least a portion of the first OFDMA packet from the wireless communication device when the third other wireless communication device determines that interference from the third OFDMA packet when transmitted via the second sub-band of the communication channel is less than or equal to the second acceptable interference level for concurrent communication.

10. The wireless communication device of claim 9, wherein the second other wireless communication device is the wireless communication device, and the fourth other wireless communication device is the wireless communication device.

11. The wireless communication device of claim 9, wherein the OFDMA packet includes the SIG followed by another SIG.

12. The wireless communication device of claim 9 further comprising:
the communication interface configured to support communications within at least one of a satellite communication system, a wireless communication system, a wired communication system, a fiber-optic communication system, or a mobile communication system; and
the processing circuitry configured to transmit the first OFDMA packet via the communication interface.

13. The wireless communication device of claim 9 further comprising:
an access point (AP), wherein the at least one of the first other wireless communication device, the second other wireless communication device, the third other wireless communication device, or the fourth other wireless communication device includes a wireless station (STA).

14. A method for execution by a wireless communication device, the method comprising:
generating a first signal that includes a field that specifies an acceptable interference level for concurrent communication for use by a first other wireless communication device to determine whether a transmission from the first other wireless communication device to a second other wireless communication device acceptably or unacceptably interferes with another transmission from the wireless communication device, wherein the field specifies a first acceptable interference level for first concurrent communication within a first sub-band of a communication channel and a second acceptable interference level for second concurrent communication within a second sub-band of the communication channel;
transmitting, via a communication interface of the wireless communication device, the first signal to a third other wireless communication device via the communication channel, wherein a second signal is transmitted from the first other wireless communication device to the second other wireless communication device via the communication channel and during transmission of at least a portion of the first signal from the wireless communication device when the first other wireless communication device determines that interference from the second signal is less than or equal to the acceptable interference level for concurrent communication; and
transmitting, via the communication interface of the wireless communication device, the first signal to the third other wireless communication device, wherein the first other wireless communication device is permitted to transmit the second signal to the second other wireless communication device within the first sub-band of the communication channel during the transmission of the at least a portion of the first signal from the wireless communication device when the first other wireless communication device determines that interference from the second signal is less than or equal to the acceptable interference level for concurrent communication, and wherein a fourth other wireless communication device is permitted to transmit a third signal to a fifth other wireless communication device within the second sub-band of the communication channel during the transmission of the at least a portion of the first signal from the wireless communication device when the fourth other wireless communication device determines that interference from the second signal is less than or equal to the acceptable interference level for concurrent communication.

15. The method of claim 14, wherein at least one of the wireless communication device, the first other wireless communication device, the second other wireless communication device, the third other wireless communication device, the fourth other wireless communication device, or the fifth other wireless communication device includes a laptop computer, a tablet, a personal digital assistant, a personal computer, or a cellular telephone.

16. The method of claim 14, wherein the wireless communication device includes a wireless station (STA), and at least one of the first other wireless communication device, the second other wireless communication device, the third other wireless communication device, the fourth other wireless communication device, or the fifth other wireless communication device includes another STA.

17. The method of claim 14, wherein the second other wireless communication device is the wireless communication device, and the fifth other wireless communication device is the wireless communication device.

18. The method of claim 14, wherein the first signal includes an orthogonal frequency division multiple access (OFDMA) packet, and the field within the OFDMA packet that specifies the acceptable interference level for concurrent communication includes a signal field (SIG) within the OFDMA packet.

19. The method of claim 14, wherein the first signal includes an orthogonal frequency division multiple access (OFDMA) packet, and the field within the OFDMA packet that specifies the acceptable interference level for concurrent communication includes a first signal field (SIG) that is followed by a second SIG within the OFDMA packet.

20. The method of claim 14, wherein the wireless communication device includes an access point (AP), and at least one of the first other wireless communication device, the second other wireless communication device, or the third other wireless communication device includes a wireless station (STA).

\* \* \* \* \*